(12) United States Patent
Kato et al.

(10) Patent No.: US 9,247,189 B2
(45) Date of Patent: Jan. 26, 2016

(54) OPTICAL MODULE AND SCAN-TYPE IMAGE PROJECTION DISPLAY DEVICE

(71) Applicant: Hitachi Media Electronics Co., Ltd., Oshu-shi, Iwate (JP)

(72) Inventors: Seiichi Kato, Tsuchiura (JP); Masahiko Kamesawa, Yokohama (JP); Teppei Tanaka, Yokohama (JP); Nobuyuki Maki, Tsuchiura (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 146 days.

(21) Appl. No.: 13/851,114

(22) Filed: Mar. 27, 2013

(65) Prior Publication Data

US 2014/0055756 A1    Feb. 27, 2014

(30) Foreign Application Priority Data

Aug. 24, 2012   (JP) .................. 2012-184842

(51) Int. Cl.
| | |
|---|---|
| G03B 21/16 | (2006.01) |
| H04N 9/31 | (2006.01) |
| H04N 5/74 | (2006.01) |
| F21V 29/00 | (2015.01) |
| G02B 26/10 | (2006.01) |

(52) U.S. Cl.
CPC .............. *H04N 5/7408* (2013.01); *F21V 29/20* (2013.01); *G02B 26/101* (2013.01); *H04N 9/3129* (2013.01); *H04N 9/3173* (2013.01); *G03B 21/16* (2013.01); *H04N 9/3144* (2013.01)

(58) Field of Classification Search
CPC ....................................................... G03B 21/16
USPC .............. 353/52, 119, 54, 122; 362/294, 373, 362/800
See application file for complete search history.

(56) References Cited

U.S. PATENT DOCUMENTS

| | | | | |
|---|---|---|---|---|
| 2007/0273794 | A1* | 11/2007 | Sprague et al. | 348/744 |
| 2010/0290011 | A1* | 11/2010 | Chen | 353/61 |
| 2011/0001937 | A1* | 1/2011 | Matsumoto | 353/54 |
| 2013/0242265 | A1* | 9/2013 | Kato et al. | 353/31 |

FOREIGN PATENT DOCUMENTS

| | | |
|---|---|---|
| JP | 2009-533715 | 9/2009 |
| JP | 2011-150742 | 8/2011 |
| WO | WO 2007/120831 A2 | 10/2007 |

* cited by examiner

*Primary Examiner* — William C Dowling
*Assistant Examiner* — Ryan Howard
(74) *Attorney, Agent, or Firm* — Baker Botts L.L.P.

(57) ABSTRACT

An optical module including a plurality of laser diodes and outputting optical beams emitted from the laser diodes includes a radiator unit for radiating heat and a case enclosing the optical module. The case has a first attachment surface to which a red laser diode is attached, a second attachment surface to which a green laser diode is attached, and a corner part where the first and second attachment surfaces intersect with each other. The optical module has a first attachment part, for connecting the case to the radiator unit, in the vicinity of the corner part.

12 Claims, 10 Drawing Sheets

FIG.2

1a: RED
1b: GREEN
1c: BLUE

OPTICAL MODULE AND SCAN-TYPE IMAGE PROJECTION DISPLAY DEVICE

BACKGROUND OF THE INVENTION

1. Field of the Invention

The present invention relates to an optical module and a scan-type image projection display device. In particular, the present invention relates to, for example, an optical module for coupling optical beams emitted from a plurality of laser diodes into a beam on one optical axis and outputting the coupled optical beam, and a scan-type image projection display device for displaying images by use of the optical beam from the optical module.

2. Description of the Related Art

Small-sized projectors, easily portable and capable of displaying images in large screen sizes, are being developed actively in recent years. Small-sized projectors connectable to notebook PCs, video cameras equipped with a built-in projector capable of projecting recorded images, etc. are already available commercially. Cellular phones and smartphones equipped with a built-in projector are also expected to appear in the near future.

As the projecting methods for the projectors, the type is known in which a lamp or an LED (Light Emitting Diode) is used as the light source and images displayed by liquid crystal panels or a DMD (Digital Micromirror Device) is projected. On the other hand, laser projectors (scan-type image projection display devices) are also under development. Such projectors use a laser diode as the light source and display images by allowing a movable mirror to scan an optical beam emitted from the laser diode. Since a laser diode emitting a laser beam is used as the light source, the focusing is unnecessary and the luminance of the images can be increased with ease. Therefore, the laser projectors (scan-type image projection display device) are considered to be highly suitable for the purpose of projecting images onto an appropriate wall available at a place away from home.

Further, the laser projectors (scan-type image projection display device) may be installed in cars while taking advantage of the high luminance of images. In this case, it is conceivable that the laser projectors will be applied to head-up displays for projecting and displaying on the windshield images such as navigation images.

The configuration of a scan-type image projection display device capable of displaying color images by use of laser diodes of three colors (red, blue, green) has been described in JP-T-2009-533715, for example. The scan-type image projection display device of the JP-T-2009-533715 includes a beam coupling unit which couples the three laser beams of the three colors into a synthetic beam propagating along one optical axis and a beam scanner which scans (periodically changes) the deflection direction of the synthetic beam. In the configuration of the beam coupling unit described in the JP-T-2009-533715, the three light sources are arranged in parallel. The three beams from the light sources are emitted in the same direction, reflected by corresponding beam coupling mirrors, respectively, and thereby coupled into the synthetic beam.

Incidentally, while green light is acquired by performing wavelength conversion on infrared light by means of SHG (Second Harmonic Generation) also in the JP-T-2009-533715 since there were no laser diodes directly emitting green light, such laser diodes directly emitting green light are becoming available in these years.

SUMMARY OF THE INVENTION

In such scan-type image projection display devices, it is essential to precisely overlay together the optical axes of the three color beams on one axis and maintain the precisely overlaid optical axes during the operation of the device against external disturbance such as changes in the ambient temperature. If some of the optical axes shift from the original positions, relative displacement occurs between the beam spots of the colors in the display area (e.g., screen) and the displayed images become blurry.

Therefore, the assembling of the optical module has to be carried out while making adjustment so as to make the three-color optical axes perfectly coincide with one another. Further, if the temperature of the laser diodes rises extremely due to a temperature rise of the scan-type image projection display device in use and exceeds the operation guarantee temperature of the laser diodes, the temperature-dependent laser wavelength variations cause a difference in the luminous efficacy (luminosity factor) among the colors and that results in color shifts in the displayed image (e.g. reddish colors throughout the image). The high temperature also causes a drop in the laser outputs and a decrease in the operating life of the laser diodes. Thus, the optical module has to be equipped with a radiator unit in order to suppress the temperature rise during the laser beam emission.

A method employable for attaching the optical module to a radiator unit has been described in JP-2011-150742-A, for example.

However, the attaching method of the JP-2011-150742-A has not paid attention to the positions of attachment suitable for preventing the shift and rotation of the optical axes of the optical components even though the shift and rotation of the optical components' optical axes are essential problems with the optical module to be considered.

It is therefore an object of the present invention to provide a small-sized optical module having an attachment structure for the optical components and being capable of reducing the relative beam spot displacement in the display area (e.g., screen), and to provide a scan-type image projection display device including such an optical module.

In order to achieve the above object, an aspect of the present invention provides an optical module including a plurality of laser diodes and outputting optical beams emitted from the laser diodes. The optical module includes a radiator unit for radiating heat and a case enclosing the optical module. The case has a first attachment surface to which a red laser diode is attached, a second attachment surface to which a green laser diode is attached, and a corner part where the first and second attachment surfaces intersect with each other. The optical module has a first attachment part, for connecting the case to the radiator unit, in the vicinity of the corner part.

Preferably, the case enclosing the optical module has a second attachment part at a position diagonal to the first attachment part in the vicinity of the corner part.

Preferably, the case enclosing the optical module has a third attachment part separately from the first and second attachment parts at a corner distant from the laser diodes.

Preferably, at least one of the attachment parts has a slit.

Preferably, a resin member is used for the connection between the radiator unit and the case enclosing the optical module.

According to the present invention, an optical module and a scan-type image projection display device capable of reducing the relative beam spot displacement in the display area (e.g., screen) can be provided.

The present invention achieves the same effect also for the head-up displays installed in cars, for example. A scan-type image projection display device (e.g., head-up display) including an optical module having the effect of reducing the relative beam spot displacement (relative displacement among the beam spots of the laser beams emitted from a plurality of laser diodes) in the display area (e.g., on the windshield) can be provided.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Referring now to the drawings, a description will be given in detail of preferred embodiments according to the present invention. Components that are assigned identical reference characters in the drawings are those having the same functions, and thus explanation of such equivalent components can be omitted when an explanation has already been given. In order to clarify explanations given of the positions of components, orthogonal coordinate axes (x-axis, y-axis, z-axis) are indicated in appropriate drawings.

<First Embodiment>

Figure 1:
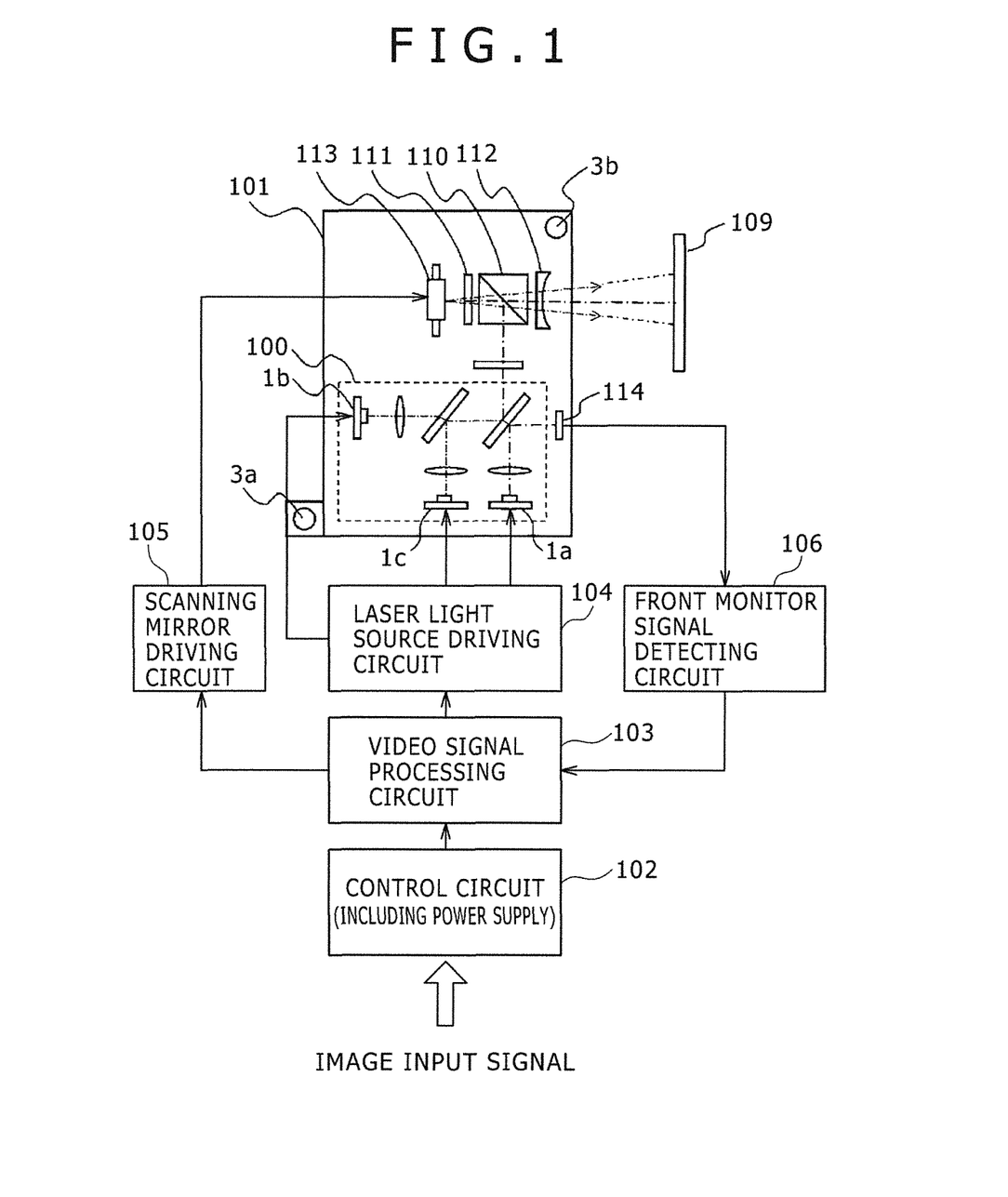
FIG. 1 is a block diagram showing the overall configuration of a scan-type image projection display device according to a first embodiment of the present invention.

FIG. 1 is a block diagram showing the configuration of a scan-type image projection display device according to a first embodiment of the present invention.

In FIG. 1, an optical module 101 of the scan-type image projection display device includes a laser light source module 100, a projection unit, and a scanning unit. The laser light source module 100 includes a first laser 1a, a second laser 1b and a third laser 1c serving as laser light sources corresponding to three colors (red (R), green (G), blue (B)) and a beam coupling unit for coupling the optical beams (laser beams) emitted from the laser light sources. The projection unit projects the coupled optical beam onto a screen 109. The scanning unit executes two-dimensional scanning of the projected optical beam on the screen 109. The projection unit includes a polarization beam splitter (PBS) 110, a quarter wave plate 111, a view angle enlarging element 112, etc. The scanning unit includes a scanning mirror 113, etc. The optical module 101 has a first attachment part 3a between the second laser 1b and the third laser 1c. The first attachment part 3a is attached to a radiator unit 120 which is unshown in FIG. 1. The optical module 101 also has a second attachment part 3b at a position diagonal to the first attachment part 3a. The second attachment part 3b is also used for attaching the optical module 101 to the radiator unit 120.

An image input signal shown in FIG. 1 is inputted to a video signal processing circuit 103 via a control circuit 102 including a power supply, etc. The video signal processing circuit 103 performs various processes on the inputted image signal, separates the processed signal into three color signals (R/G/B signals), and sends the three color signals to a laser light source driving circuit 104. The laser light source driving circuit 104 supplies emission drive currents (R/G/B) to corresponding laser diodes in the laser light source module 100 according to the luminance values of the R/G/B signals, respectively. Consequently, the red, green and blue laser diodes respectively emit optical beams having intensities corresponding to the luminance values of the R/G/B signals in sync with the display timing.

The video signal processing circuit 103 extracts synchronizing signals from the image signal and sends the extracted synchronizing signals to a scanning mirror driving circuit 105. In sync with the synchronizing signals (horizontal synchronizing signal, vertical synchronizing signal), the scanning mirror driving circuit 105 supplies the scanning mirror 113 of the optical module 101 with drive signals for repeatedly rotating the mirror surface of the scanning mirror 113 in a two-dimensional manner. According to the drive signals, the scanning mirror 113 reflects the optical beam while repeatedly and periodically rotating the mirror surface by prescribed angles. Consequently, the optical beam is scanned on the screen 109 in the horizontal and vertical directions to display an image.

A front monitor signal detecting circuit 106 receives a signal inputted from a front monitor 114 and detects output levels of the R/G/B beams emitted from the laser diodes. The detected output levels are inputted to the video signal processing circuit 103 and used for controlling the outputs of the laser diodes at desired output levels.

The scanning mirror 113 can be implemented by a biaxially driven mirror manufactured by using the MEMS (Micro Electro Mechanical Systems) technology, for example. There are biaxially driven mirrors employing various driving methods, such as piezoelectric driving, electrostatic driving and electromagnetic driving.

It is also possible to prepare two uniaxially driven scan mirrors and arrange the two mirrors to be capable of scanning the optical beam in directions orthogonal to each other.

In the following, the optical module 101 according to the present invention will be explained in detail.

Figure 2:
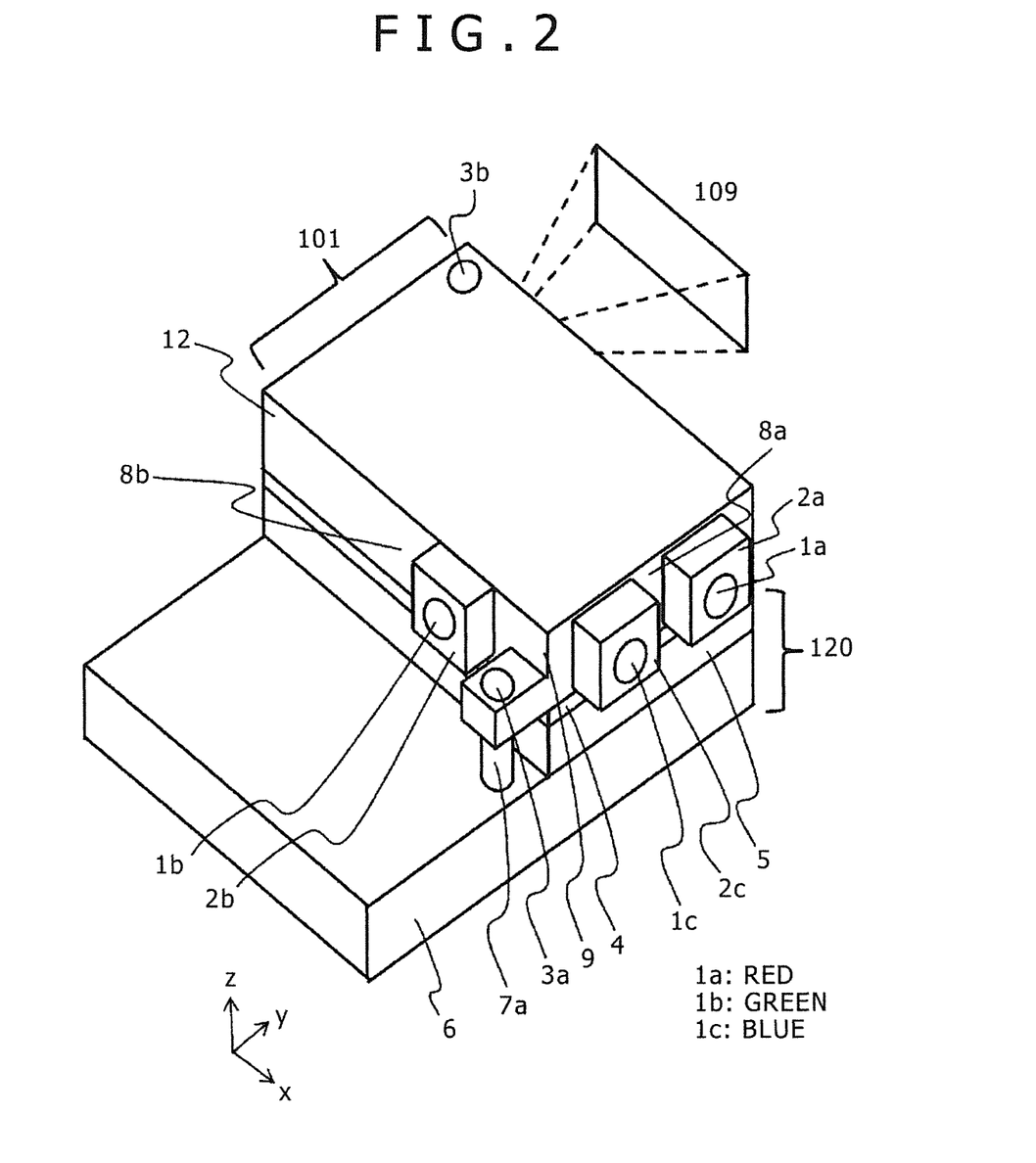
FIG. 2 is a perspective view for explaining an optical module according to the first embodiment of the present invention.

FIG. 2 is a perspective view for explaining the optical module according to the first embodiment of the present invention.

In FIG. 2, the optical module 101 includes the first laser 1a, the second laser 1b and the third laser 1c. The laser diodes 1a, 1b and 1c are respectively attached to a first laser holder 2a, a second laser holder 2b and a third laser holder 2c which are used for improving the handling. The first laser holder 2a, the second laser holder 2b and the third laser holder 2c are attached to a case 12 of the optical module 101 by using an adhesive agent, screws, springs, or the like.

Incidentally, if the temperature of the laser diodes rises extremely due to a temperature rise of the scan-type image projection display device in use and exceeds the operation guarantee temperature of the laser diodes, the temperature-dependent laser wavelength variations cause a difference in the luminous efficacy (luminosity factor) among the colors and that results in color shifts in the displayed image (e.g. reddish colors throughout the image). The high temperature also causes a drop in the laser outputs and a decrease in the operating life of the laser diodes. Thus, the optical module 101 has to be equipped with the radiator unit 120 in order to suppress the temperature rise during the laser beam emission.

Especially in the head-up displays installed in cars, etc., the ambient temperature can range from minus some tens of degrees Celsius (when the car is left in a cold district) to approximately plus 100 degrees Celsius (when the car is left in a tropical climate). Since there exist conditions in which the ambient temperature range is wider than the operation guarantee temperature range of the laser diodes, the optical modules and the scan-type image projection display devices including the optical modules require the heating/cooling for adjusting the temperature within the operation guarantee temperature range of the laser diodes.

In this case, the attachment structure between the optical module 101 and the radiator unit 120 becomes a problem.

The attachment structure is required to set the optical module 101 and the radiator unit 120 in close contact with each other in order to increase the efficiency of the radiation. In attaching methods like screwing, however, the screwing torque can cause deformation to the case 12 of the optical module 101 and displacement or rotation to the optical components, leading to an optical axis shift of the laser beam of each color, that is, the aforementioned relative beam spot displacement in the display area (e.g., screen). Therefore, an increase in the radiation efficiency and an appropriate attachment structure capable of suppressing the deformation at the time of the attachment (e.g. screwing) become necessary. Since the beam diameters of the laser beams are small especially inside the laser light source module 100 having the beam coupling unit for coupling together the optical beams (laser beams) emitted from the laser light sources, the accuracy of the attachment of each optical component has to be within the order of μm. Therefore, after the adjustment of the optical axes has been made, it is essential to suppress the deformation of the case 12 at the time of the attachment of the optical module 101 to the radiator unit 120.

In the first embodiment of the present invention, the case 12 is provided with a first attachment surface 8a to which the first laser 1a and the third laser 1c are attached and a second attachment surface 8b to which the second laser 1b is attached. The first attachment surface 8a and the second attachment surface 8b are arranged to intersect with each other. In the vicinity of a corner part 9 where the first and second attachment surfaces 8a and 8b intersect with each other, the first attachment part 3a enabling the attachment (e.g. screwing) is formed. The first attachment part 3a formed in the vicinity of the first laser 1a, the second laser 1b and the third laser 1c (heat radiating components) can be brought into close contact with the radiator unit 120 by screwing, etc., achieving the increase in the radiation efficiency. Further, the deformation of the case 12 caused by the screwing torque, etc. can be suppressed by forming a high-rigidity part of the case 12 (the corner part 9) and arranging the first attachment part 3a at the high-rigidity part. The first attachment part 3a achieves both the increase in the radiation efficiency of the optical module 101 and the suppression of the deformation of the case 12 at the time of the attachment of the optical module 101 to the radiator unit 120. Through the suppression of the displacement of the laser diodes, an optical module 101 capable of reducing the relative beam spot displacement can be implemented.

The attachment of the optical module 101 to the radiator unit 120 at one position (i.e., the first attachment part 3a) can become instable. Therefore, the close contact between the optical module 101 and the radiator unit 120 may be stabilized by forming the second attachment part 3b at the position in the optical module 101 diagonal to the first attachment part 3a and attaching the optical module 101 to the radiator unit 120 at the two positions.

The optical module 101 may be adapted to a head-up display installed in a car, etc., by connecting the lower surface or the upper surface of the optical module 101 to a cooling element 5 (as the radiator unit 120) via thermal grease 4, a thermal conductive sheet or thermal gel and further to a heat spreader 6 (as the radiator unit 120). In this case, the first and second attachment parts 3a and 3b may be connected to the heat spreader 6 by using screws made of resin as a first connection member 7a and a second connection member 7b (unshown) so as to avoid heat transmission from the heat spreader 6 to the optical module 101.

As for the first through third laser diodes 1a-1c, the power consumption is the highest in the green laser diode, intermediate in the red laser diode, and the lowest in the blue laser diode due to the properties of the laser diodes. Therefore, the amount of heat emission from the laser diode (the amount of energy turning into heat without being converted to the laser light) is the highest in the green laser diode, intermediate in the red laser diode, and the lowest in the blue laser diode. In order to prevent the thermal interference between laser diodes, it is possible to employ the red laser diode and the green laser diode as the first laser 1a and the second laser 1b, respectively, arrange the first and second laser diodes 1a and 1b at positions distant from each other, and provide the first attachment part 3a in the vicinity of the second laser 1b emitting the highest amount of heat. With such an arrangement, the radiation efficiency can be increased further.

The radiator unit 120 may also be implemented by connecting the optical module 101 directly to the heat spreader 6.

<Second Embodiment>

Figure 3:
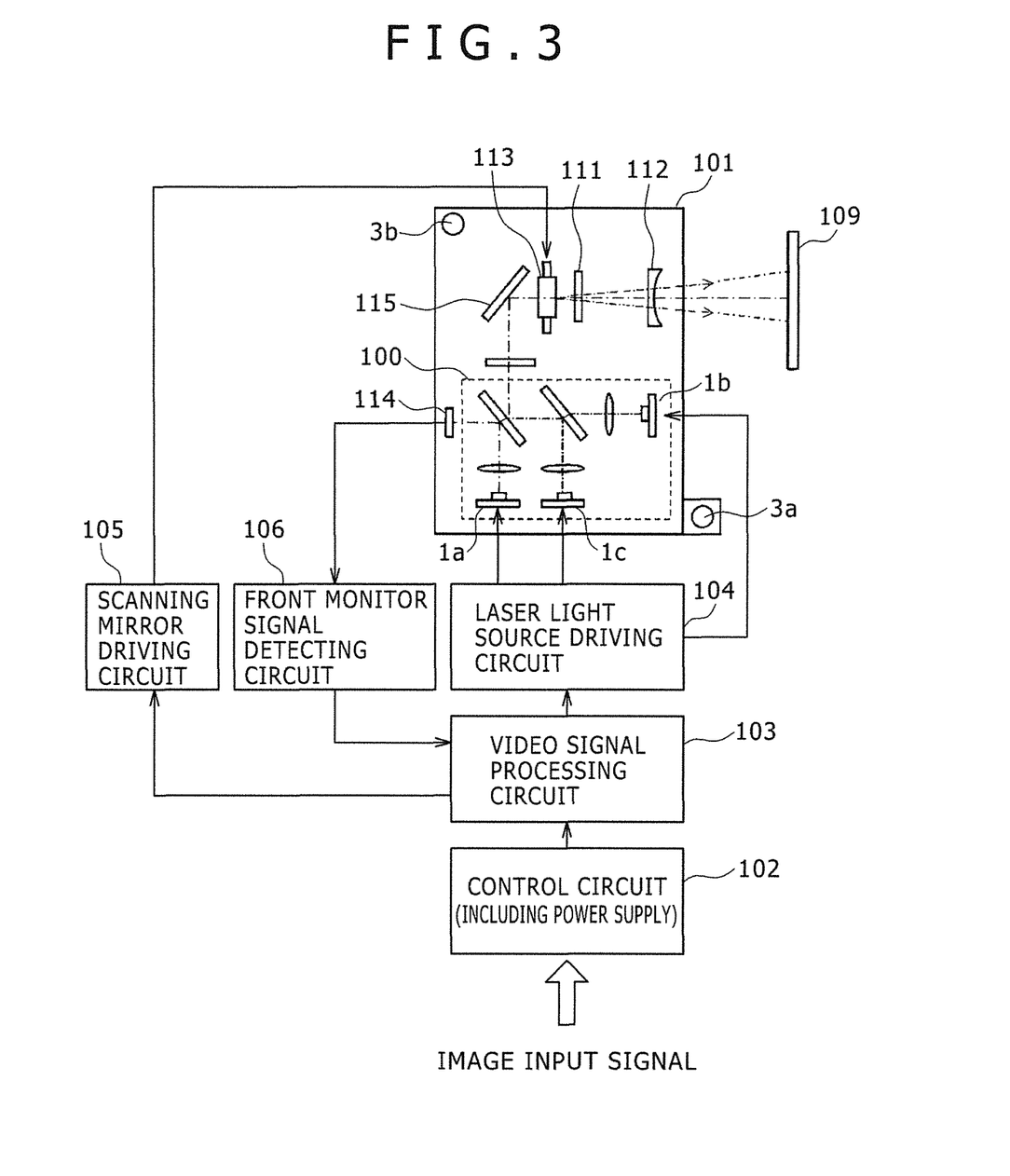
FIG. 3 is a block diagram showing the overall configuration of a scan-type image projection display device according to a second embodiment of the present invention.

FIG. 3 is a block diagram showing the configuration of a scan-type image projection display device according to a second embodiment of the present invention.

The second embodiment differs from the first embodiment in that the scanning mirror 113 (employed in the first embodiment) is configured in the second embodiment to project the image from its back side to its front side as shown in FIG. 3.

Therefore, the first laser 1a, the second laser 1b, the third laser 1c, the first attachment part 3a and the second attachment part 3b are arranged symmetrically to those in FIG. 1 in regard to the horizontal direction and the image is projected from the back to the front of the scanning mirror 113 via a reflecting mirror 115 which is used instead of the polarization beam splitter 110. The other configuration of the scan-type image projection display device is basically equivalent to that in the first embodiment.

Figure 4:
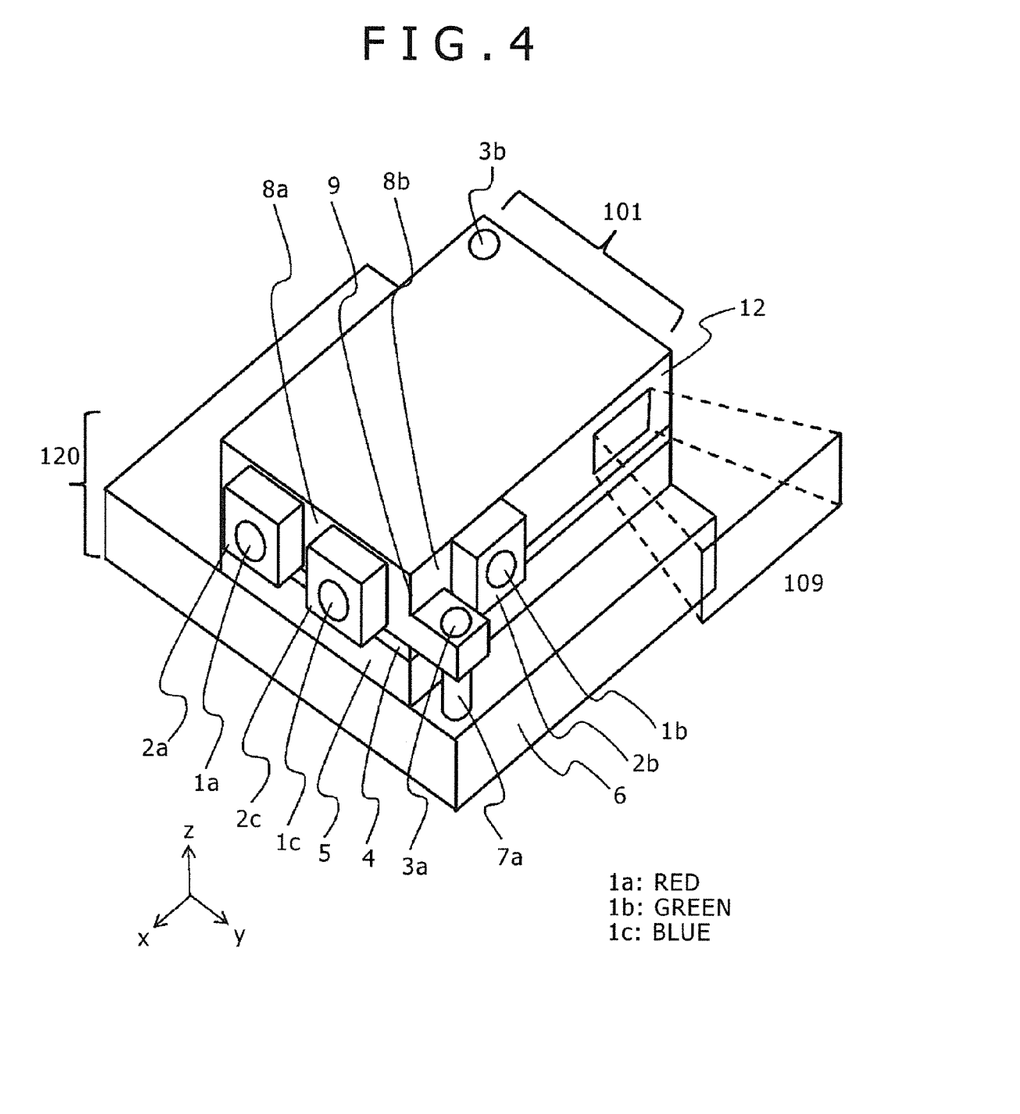
FIG. 4 is a perspective view for explaining an optical module according to the second embodiment of the present invention.

FIG. 4 is a perspective view for explaining the optical module according to the second embodiment of the present invention.

Also in the second embodiment, the case 12 is provided with the first attachment surface 8a (to which the first laser 1a and the third laser 1s are attached) and the second attachment surface 8b (to which the second laser 1b is attached), the first attachment surface 8a and the second attachment surface 8b are arranged to intersect with each other, and the first attachment part 3a enabling the attachment (e.g. screwing) is formed in the vicinity of the corner part 9 where the first and second attachment surfaces 8a and 8b intersect with each other. The first attachment part 3a formed in the vicinity of the first laser 1a, the second laser 1b and the third laser 1c (heat radiating components) can be brought into close contact with the radiator unit 120 by screwing, etc., by which the increase in the radiation efficiency can be achieved. Further, the deformation of the case 12 caused by the screwing torque, etc. can be suppressed by forming the high-rigidity part of the case 12 (the corner part 9) and arranging the first attachment part 3a at the high-rigidity part. The first attachment part 3a achieves both the increase in the radiation efficiency of the optical module 101 and the suppression of the deformation of the case 12 at the time of the attachment of the optical module 101 to the radiator unit 120. Through the suppression of the displacement of the laser diodes, an optical module 101 capable of reducing the relative beam spot displacement can be implemented.

The attachment of the optical module 101 to the radiator unit 120 at one position (i.e., the first attachment part 3a) can become instable. Therefore, the close contact between the optical module 101 and the radiator unit 120 may be stabilized by forming the second attachment part 3b at the position in the optical module 101 diagonal to the first attachment part 3a and attaching the optical module 101 to the radiator unit 120 at the two positions.

<Third Embodiment>

Figure 5:
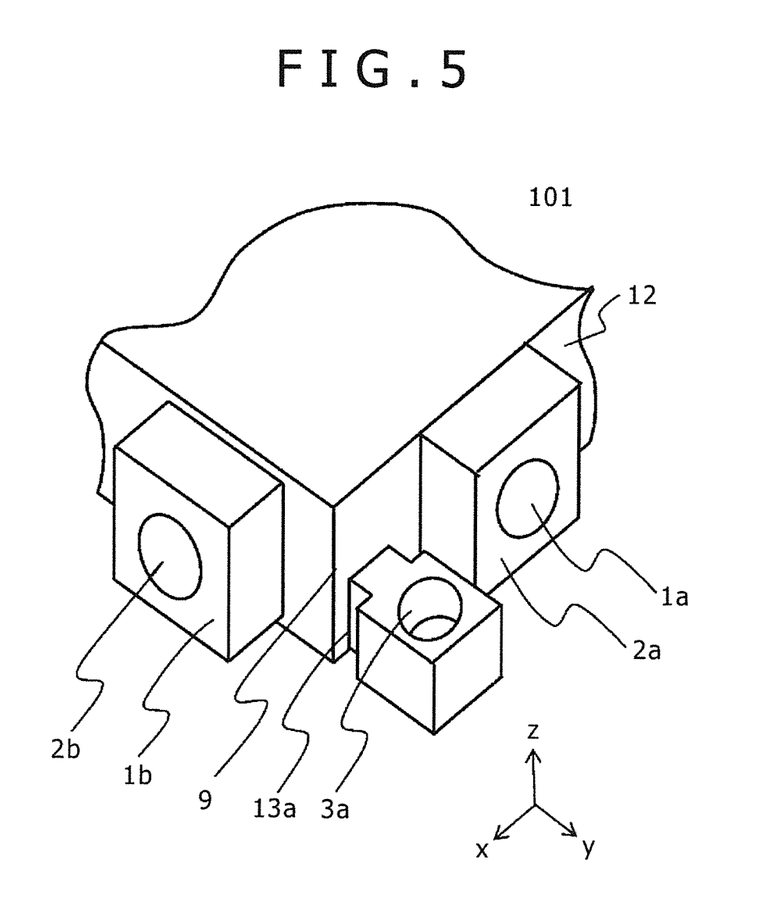
FIG. 5 is a perspective view showing a third embodiment of the present invention regarding an attachment part of a case.

FIG. 5 is a perspective view showing a third embodiment of the present invention regarding the attachment part of the case.

In order to relax the torque at the time of the attachment (e.g. screwing) of the first attachment part 3a, a slit part 13a is formed in the structure around the case 12 so as to make the slit part 13a deform and absorb the screwing torque, etc. at the time of the attachment.

By forming the slit part 13a, the deformation of the case 12 due to the screwing torque, etc. can be suppressed and the displacement/rotation of the optical components can be avoided, implementing an optical module 101 free from the optical axis shift of the laser beam of each color, that is, the relative beam spot displacement in the display area (e.g., screen).

While the slit part 13a has two slits formed on both sides of the first attachment part 3a in the example of FIG. 5, a similar effect of suppressing the deformation of the case 12 can be achieved even if one slit is formed on one side only.

<Fourth Embodiment>

Figure 6:
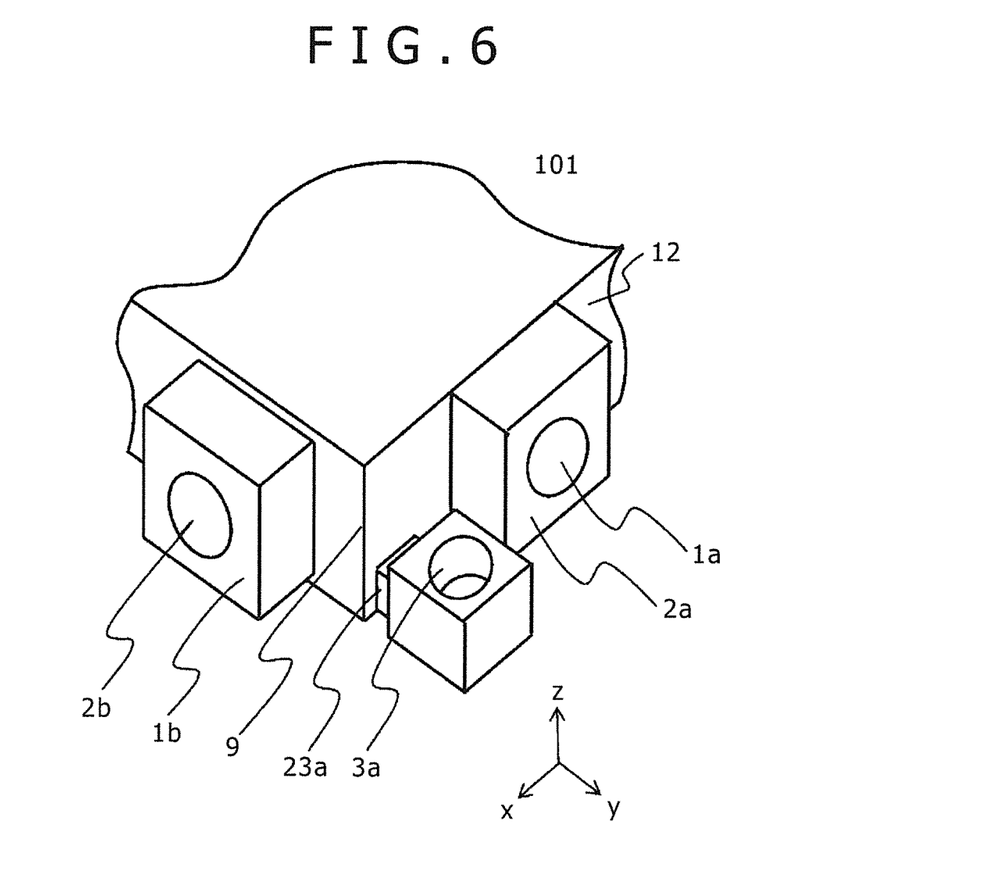
FIG. 6 is a perspective view showing a fourth embodiment of the present invention regarding the attachment part of the case.

FIG. 6 is a perspective view showing a fourth embodiment of the present invention regarding the attachment part of the case.

Similarly to the third embodiment, the first attachment part 3a is provided with a slit part 23a. In this slit part 23a, a slit is formed also in the thickness direction of the optical module 101 (z direction). The slit part 23a is capable of deforming and absorbing force also in response to force in the axial direction of the screw (z direction) at the time of screwing.

By forming the slit part 23a, the deformation of the case 12 due to the screwing torque, axial force, etc. can be suppressed and the displacement/rotation of the optical components can be avoided, implementing an optical module 101 free from the optical axis shift of the laser beam of each color, that is, the relative beam spot displacement in the display area (e.g., screen).

<Fifth Embodiment>

Figure 7:
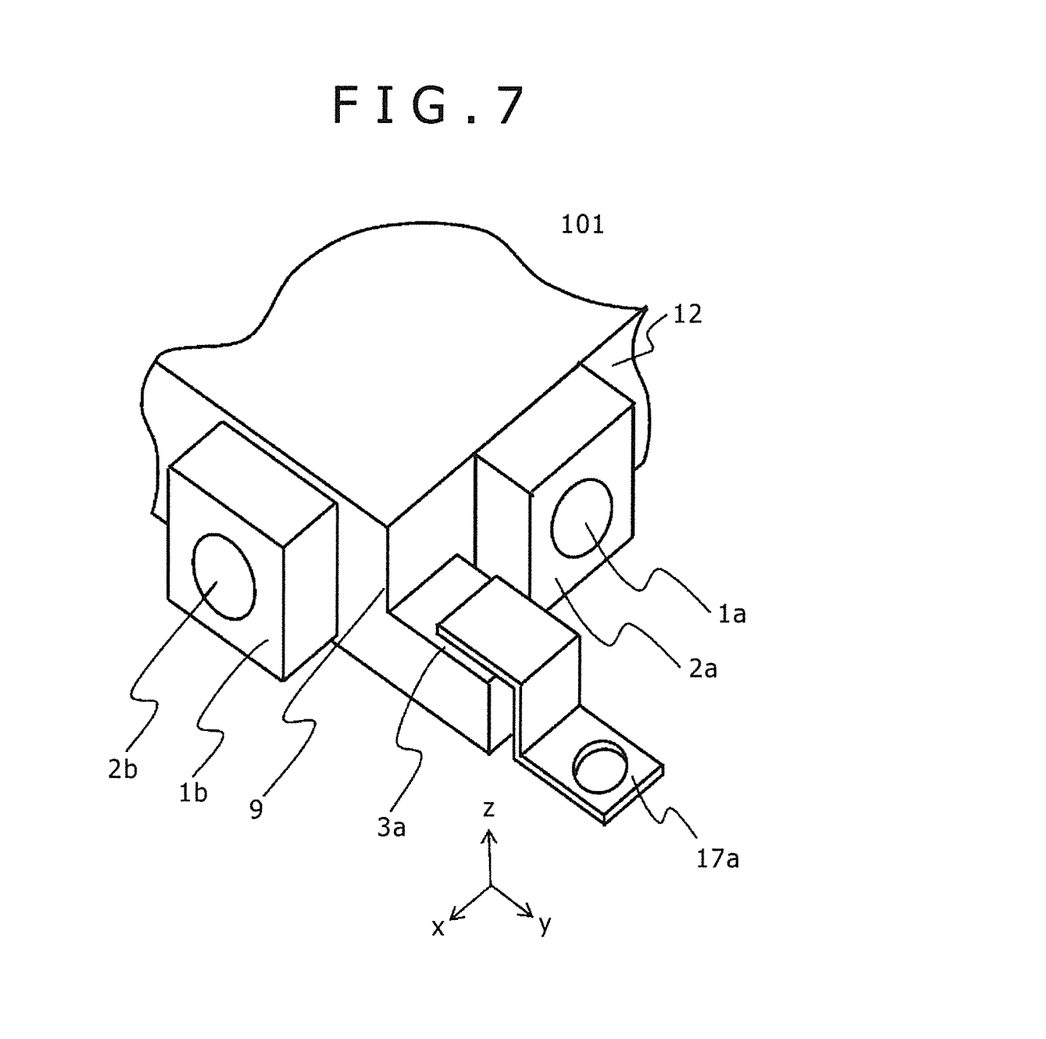
FIG. 7 is a perspective view showing a fifth embodiment of the present invention regarding the attachment part of the case.

FIG. 7 is a perspective view showing a fifth embodiment of the present invention regarding the attachment part of the case.

In order to avoid the torque at the time of the attachment (e.g. screwing) of the first attachment part 3a, the first attachment part 3a is attached to the radiator unit 120 (unshown in FIG. 7) via an attachment member 17a having a spring property, without using the screw.

By the attachment to the radiator unit 120 via the attachment member 17a, the screwing torque, etc. can be eliminated, the deformation of the case 12 can be suppressed, and the displacement/rotation of the optical components can be avoided, implementing an optical module 101 free from the optical axis shift of the laser beam of each color, that is, the relative beam spot displacement in the display area (e.g., screen).

<Sixth Embodiment>

Figure 8:
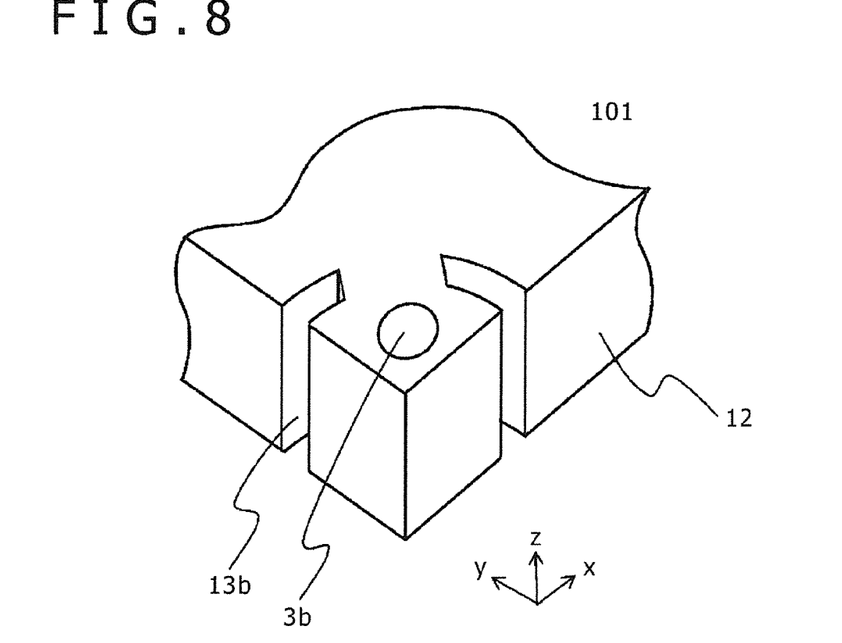
FIG. 8 is a perspective view showing a sixth embodiment of the present invention regarding the attachment part of the case.

FIG. 8 is a perspective view showing a sixth embodiment of the present invention regarding the attachment part of the case.

The embodiment shown in FIG. 8 is about the second attachment part 3b. To reduce the external size of the optical module 101, the second attachment part 3b is formed within the contour of the case 12. Further, in order to relax the torque at the time of the attachment (e.g. screwing), a slit part 13b is formed in the structure around the case 12 so as to make the slit part 13b deform and absorb the screwing torque, etc. at the time of the attachment.

By forming the slit part 13b, the deformation of the case 12 due to the screwing torque, etc. can be suppressed and the displacement/rotation of the optical components can be avoided, implementing an optical module 101 free from the optical axis shift of the laser beam of each color, that is, the relative beam spot displacement in the display area (e.g., screen).

While the slit part 13b has two slits formed on both sides of the second attachment part 3b in the example of FIG. 8, a similar effect of suppressing the deformation of the case 12 can be achieved even if one slit is formed on one side only.

Further, while the structure of the second attachment part 3b is shown in FIG. 8, this embodiment may also be applied to the structure of the first attachment part 3a.

<Seventh Embodiment>

Figure 9:
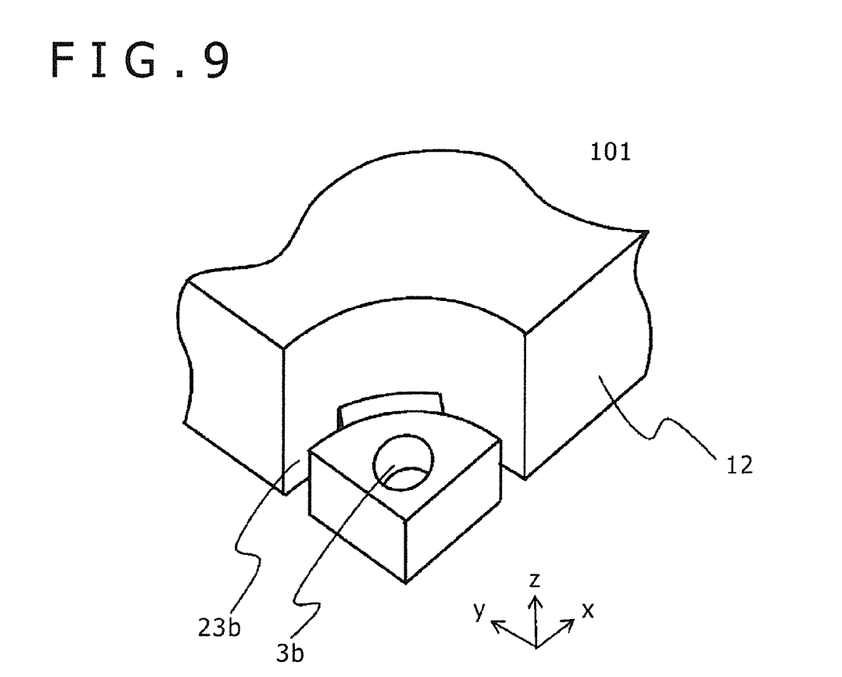
FIG. 9 is a perspective view showing a seventh embodiment of the present invention regarding the attachment part of the case.

FIG. 9 is a perspective view showing a seventh embodiment of the present invention regarding the attachment part of the case.

Similarly to the sixth embodiment, the second attachment part 3b is provided with a slit part 23b. In this slit part 23b, a slit is formed also in the thickness direction of the optical module 101 (z direction). The slit part 23a is capable of deforming and absorbing force also in response to force in the axial direction of the screw (z direction) at the time of screwing.

By forming the slit part 23b, the deformation of the case 12 due to the screwing torque, axial force, etc. can be suppressed and the displacement/rotation of the optical components can be avoided, implementing an optical module 101 free from the optical axis shift of the laser beam of each color, that is, the relative beam spot displacement in the display area (e.g., screen).

While the structure of the second attachment part 3b is shown in FIG. 9, this embodiment may also be applied to the structure of the first attachment part 3a.

<Eighth Embodiment>

Figure 10:
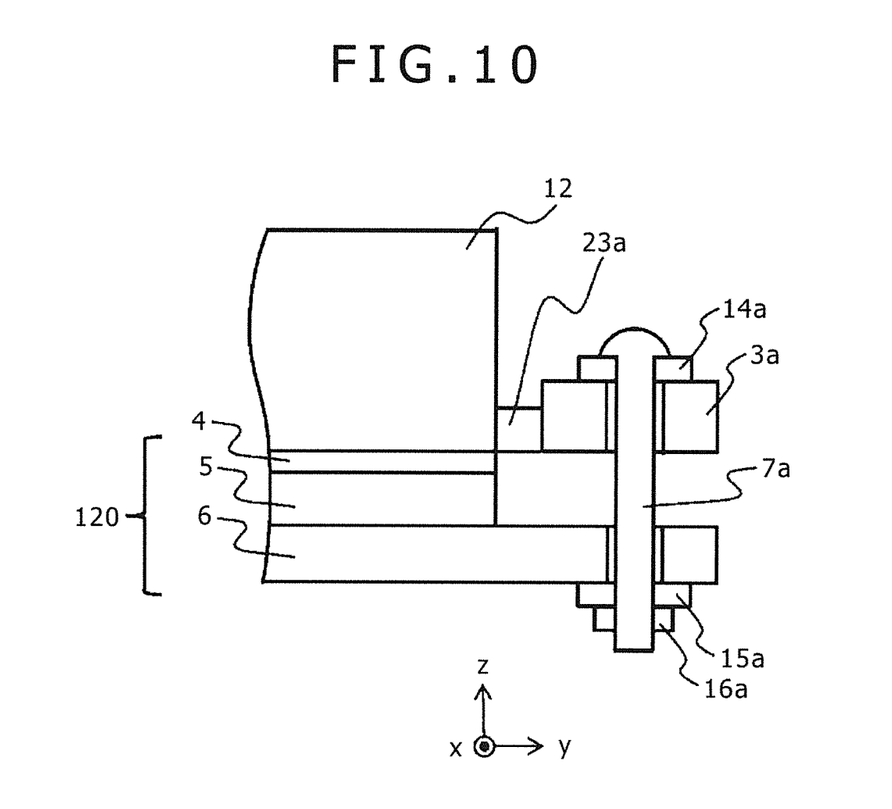
FIG. 10 is a perspective view showing an eighth embodiment of the present invention regarding the attachment part of the case.

FIG. 10 is a perspective view showing an eighth embodiment of the present invention regarding the attachment part of the case.

In a configuration of the first attachment part 3a similar to the fourth embodiment, the first attachment part 3a and the connection member 7a (e.g. screw) are attached together via a resin member 14a such as heat-insulating plastic.

Similarly, the heat spreader 6 and the connection member 7a (e.g. screw) are attached together via a member 15a such as heat-insulating plastic by using a fixation member 16a such as a nut.

The heat spreader 6 for radiating the heat of the cooling element 5 is attached to the optical module 101 via the heat-insulating members 14a and 15a. By placing the members 14a and 15a between the optical module 101 and the heat spreader 6, the inflow of heat from the heat spreader 6 into the optical module 101 can be avoided. The avoidance of the inflow of heat makes it possible to efficiently cool down the optical module 101. Consequently, the power consumption of the cooling element 5 can be reduced and the cooling time can be shortened.

The effect of the eighth embodiment is achieved considerably for radiator units 120 employing a cooling element 5 and a heat spreader 6.

<Ninth Embodiment>

Figure 11:
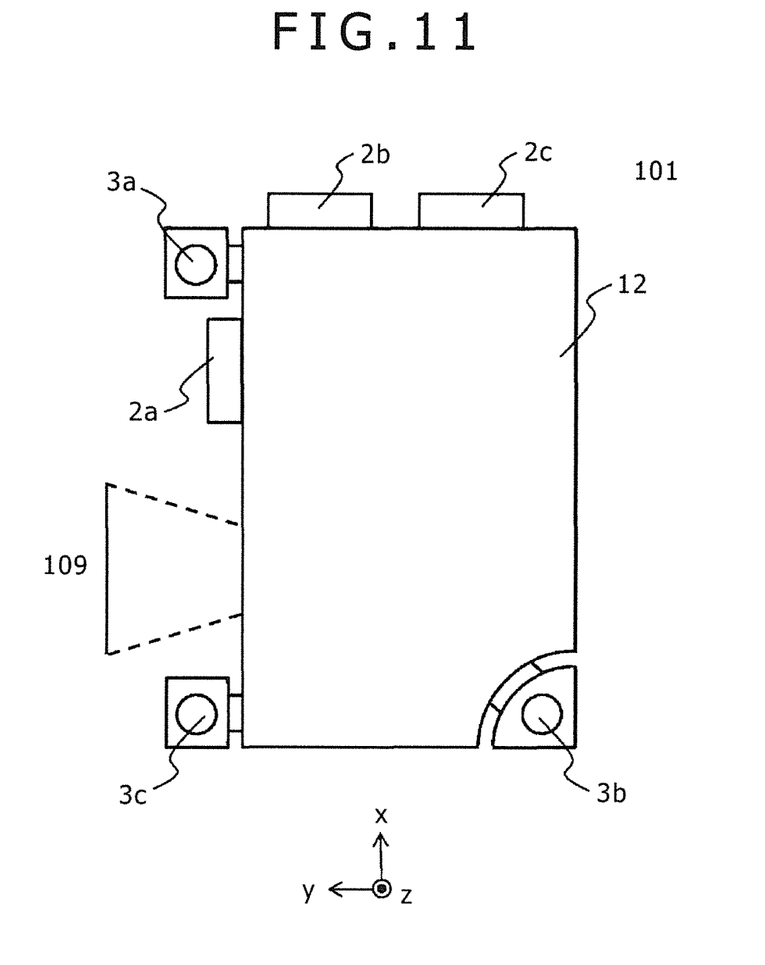
FIG. 11 is a perspective view showing a ninth embodiment of the present invention regarding the attachment part of the case.

FIG. 11 is a perspective view showing a ninth embodiment of the present invention regarding the attachment part of the case.

In addition to the first and second attachment parts 3a and 3b, a third attachment part 3c is formed at a corner of the case 12 distant from the first through third laser diodes 1a-1c so as to form a plane with the first through third attachment parts 3a-3c. Consequently, the close contact and the positioning of the optical module 101 and the radiator unit 120 (unshown in FIG. 11) are stabilized.

With this configuration, the increase in the radiation efficiency can be achieved similarly to the above embodiments and an optical module 101 free from the relative beam spot displacement in the display area (e.g., the screen 109) can be implemented.

It is to be noted that the present invention is not limited to the aforementioned embodiments, but covers various modifications. While, for illustrative purposes, those embodiments have been described specifically, the present invention is not necessarily limited to the specific forms disclosed. Thus, partial replacement is possible between the components of a certain embodiment and the components of another. Likewise, certain components can be added to or removed from the embodiments disclosed.

Note also that some or all of the aforementioned components, functions, processors, and the like can be implemented by hardware such as an integrated circuit or the like. Alternatively, those components, functions, and the like can be implemented by software as well. In the latter case, a processor can interpret and execute the programs designed to serve those functions. The programs, associated data tables, files, and the like can be stored on a stationary storage device such as a memory, a hard disk, and a solid state drive (SSD) or on a portable storage medium such as an integrated circuit card (ICC), an SD card, and a DVD.

Further note that the control lines and information lines shown above represent only those lines necessary to illustrate the present invention, not necessarily representing all the lines required in terms of products. Thus, it can be assumed that almost all the components are in fact interconnected.

What is claimed is:

1. An optical module comprising a plurality of laser diodes, the optical module outputting optical beams emitted from the laser diodes, wherein:
    the optical module comprises a radiator unit for radiating heat and a case enclosing the optical module,
    the case has a first attachment surface to which a red laser diode is attached, a second attachment surface to which a green laser diode is attached, and a corner part where the first and second attachment surfaces intersect with each other, and a third surface that includes portions of the first and second attachment surfaces, wherein heat is conducted between the third surface and the radiator unit, and
    the optical module has a first attachment part for connecting the case to the radiator unit in the vicinity of the corner part,
    wherein a resin member is used for the connection between the radiator unit and the case enclosing the optical module.

2. The optical module according to claim 1, wherein the case enclosing the optical module has a second attachment part at a position diagonal to the first attachment part in the vicinity of the corner part.

3. The optical module according to claim 1, wherein the case enclosing the optical module has a third attachment part separately from the first attachment part at a corner distant from the laser diodes.

4. The optical module according to claim 2, wherein the case enclosing the optical module has a third attachment part separately from the first and second attachment parts at a corner distant from the laser diodes.

5. The optical module according to claim 1, wherein the attachment part has a slit.

6. The optical module according to claim 2, wherein at least one of the attachment parts has a slit.

7. The optical module according to claim 3, wherein at least one of the attachment parts has a slit.

8. The optical module according to claim 4, wherein at least one of the attachment parts has a slit.

9. An optical module comprising a plurality of laser diodes, the optical module outputting optical beams emitted from the laser diodes, wherein:
    the optical module comprises a radiator unit for radiating heat and a case enclosing the optical module,
    the case has a first attachment surface to which a red laser diode is attached, a second attachment surface to which a green laser diode is attached, and a corner part where the first and second attachment surfaces intersect with each other, and
    the optical module has a first attachment part for connecting the case to the radiator unit in the vicinity of the corner part, wherein a resin member is used for the connection between the radiator unit and the case enclosing the optical module.

10. A scan-type image projection display device which comprises an optical module according to claim 1.

11. The scan-type image projection display device according to claim 10, wherein the case enclosing the optical module has a second attachment part at a position diagonal to the first attachment part in the vicinity of the corner part.

12. The scan-type image projection display device according to claim 10, wherein the case enclosing the optical module has a third attachment part separately from the first attachment part at a corner distant from the laser diodes.

* * * * *